Aug. 4, 1959 D. T. BULL ET AL 2,897,533
GROMMETS, BUSHINGS AND THE LIKE
Filed Feb. 16, 1956
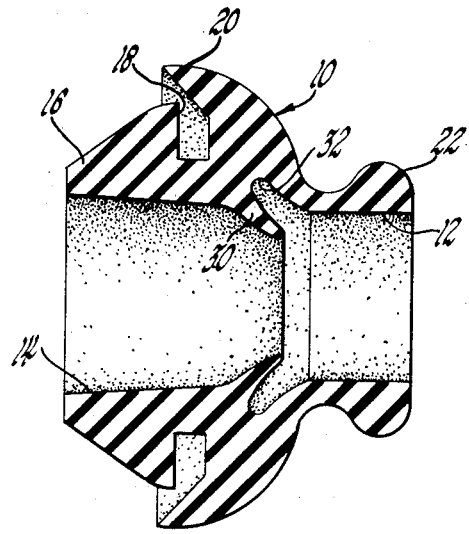
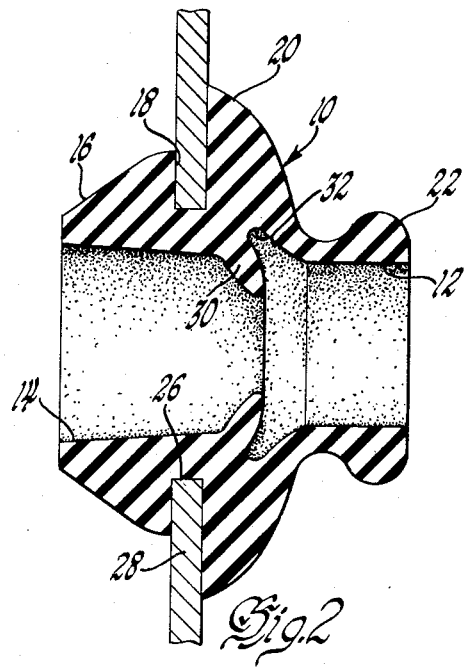
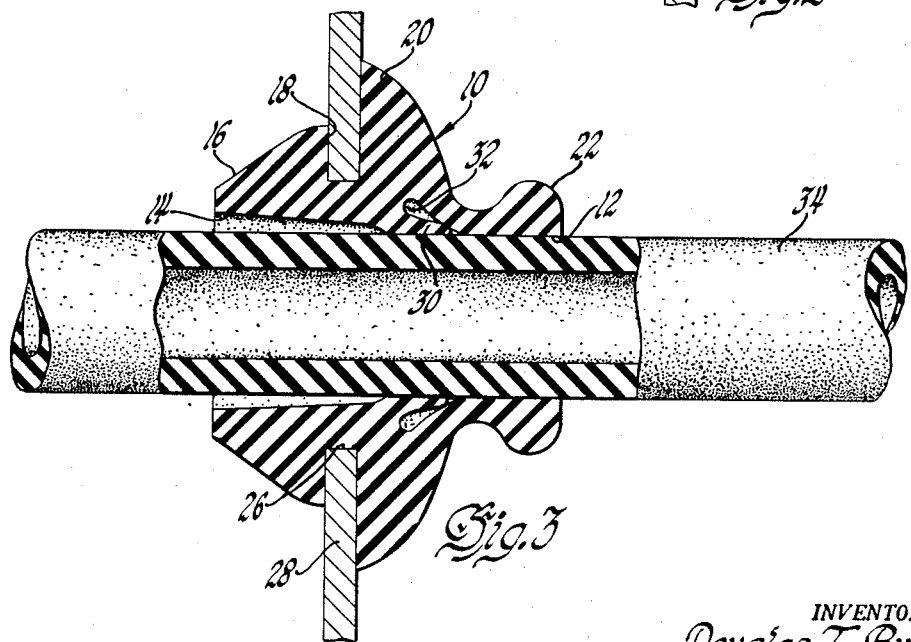
INVENTORS.
Douglas T. Bull &
BY Arkady A. Lobanoff
L. D. Burch
ATTORNEY.

United States Patent Office 2,897,533
Patented Aug. 4, 1959

2,897,533

GROMMETS, BUSHINGS AND THE LIKE

Douglas T. Bull, St. Clair Shores, and Arkady A. Lobanoff, Birmingham, Mich., assignors to General Motors Corporation, Detroit, Mich., a corporation of Delaware Application February 16, 1956, Serial No. 565,850

1 Claim. (Cl. 16—2)

This invention relates to grommets, bushings and the like which may be mounted within a wall or panel to receive and retain another member therein against relative movement.

Electrical wires, cables, hydraulic lines, drain hoses, and other connections which are required to be extended through walls or panels and are subjected to vibrations and other forces moving them relative to such walls and panels, as in an automotive vehicle, require grommet or bushing means to prevent the connections from becoming worn and from rattling as well as to seal the panel about the connection and prevent the admission of moisture, air, water, and foreign substances through the wall or panel.

It is here proposed to provide an improved grommet for the purposes mentioned and others, which comprises a unitary flexible body member having an external annular groove by which it may be mounted within an opening in a wall or panel and including other means for retaining the member securely to the panel. The proposed grommet also includes means for receiving a member freely through one end thereof while inhibiting its withdrawal and which, as installed, is adapted to to prevent relative movement of the member in either direction.

In the drawings:

Figure 1 is a cross-sectional view of an embodiment of the proposed grommet means.

Figure 2 is a cross-sectional view of the proposed grommet means as mounted within a receiving wall panel.

Figure 3 is a cross-sectional view of the proposed grommet means as mounted within a receiving wall panel and having a tubular member extended therethrough.

The grommet means illustrated comprises a flexible tubular body member 10 having a passage 12 formed therethrough. The walls of passage 12 are tapered near one end, as at 14, to provide a larger opening at one end thereof. The external walls of body member 10 are also tapered near the same end thereof, as at 16, to facilitate assembly of the grommet means within a panel member as will be described.

An annular groove 18 is formed within the external surface of body member 10 and has an external annular lip or flange 20, formed from the body member and extended thereover towards the tapered end of the body member.

A ferrule 22 is formed from the body member 10 at the other end thereof to facilitate grasping the body member and forcing the tapered end 16 within an opening, as 26, provided within a panel, as 28, adapted to have the grommet means mounted therein; the panel walls being received within the annular groove 18 as shown in Figures 2 and 3.

An internal lip or flange 30 is formed from the body member 10 within the passage 12 and a recess 32 is formed from the body member adjacent thereto. The internal flange is aligned with the external flange 20 through the body member and extends oppositely thereto towards the other end of the body member and over the recess 32.

Upon the receipt of a member such as tubular member 34 within the passage 12, from the enlarged end 14 thereof, the internal flange is readily displaced within recess 32 and withdrawn from other than incidental engagement with member 34. This is assuming that the grommet means is not installed within a receiving wall panel but is as shown in Figure 1, though having member 34 received therein. Although member 34 is movable more readily from the tapered end of the grommet means towards the ferruled end thereof, it is movable with but slight effort in the opposite direction, when the grommet is not installed in a wall panel, since the internal flange 30 has but limited frictional engagement with the member 34, being displaceable within the recess 32 and having only its own resiliency to resist such displacement.

With the grommet means 10 received upon the member 34, as might be the case in certain instances, it remains only to install the body member within a wall panel such as 28. Generally, however, the grommet means is first installed within the wall panel and the member 34 is thereafter passed through the body member.

When the wall panel 28 is received within the external groove 18, the flange 20 is displaced and its own resistance acts to hold the grommet more securely to the wall panel by its biased engagement therewith. At the same time, the displacement of the external flange 20 acts through the body member 10 to displace the internal flange 30 radially inwardly of the passage 12, as shown by Figure 2. With a member, such as 34, extended through the passage the internal flange 30 is biased in sealing engagement with the member 34 and, having a greater surface of the flange frictionally engaging the member, the member is firmly retained against relative movement in either direction.

The claim:

A grommet for receiving a cylindrical part comprising a flexible walled tubular member having a passage formed therethrough and an external groove formed therein, a retaining flange formed from said tubular member externally thereof and overlying said groove to retain said tubular member in an aperture in a supporting piece, said passage through said tubular member being tapered from a diameter slightly larger than the cylindrical part received within said member to a diameter slightly smaller than the part received in said tubular member to provide a snug fit about the part received therein, a bead formed on the end of said tubular member and having the neck thereof between said bead and said external retaining flange, an annular internal groove formed in said tubular member and within said passage and of a diameter greater than the internal diameter of said passage, and an annular flange formed from said tubular member and within said passage and extending thereinto, said flange having an internal diameter smaller than the diameter of said passage to force said flange against the part received in said passage and into said internal annular groove, said internal and external flanges being disposed for concurrent movement into sealing engagement with the part received in said tubular member and the supporting piece on which the tubular member is mounted, said bead providing for pivotal movement of the part received in said tubular member about said internal flange without affecting the seal provided by said internal flange.

References Cited in the file of this patent

UNITED STATES PATENTS

| | | |
|---|---|---|
| 1,287,285 | Gammeter | Dec. 10, 1918 |
| 1,800,578 | Webb | Apr. 14, 1931 |
| 2,039,009 | Lampman | Apr. 28, 1936 |
| 2,219,940 | Ritz-Woller | Oct. 29, 1940 |
| 2,225,472 | Franklin | Dec. 18, 1940 |
| 2,367,836 | Brown | Jan. 23, 1945 |
| 2,717,792 | Pelley | Sept. 13, 1955 |
| 2,721,749 | Crow | Oct. 25, 1955 |